United States Patent [19]
Boschert

[11] 4,051,445
[45] Sept. 27, 1977

[54] INVERTER CONVERTER CIRCUIT FOR MAINTAINING OSCILLATIONS THROUGHOUT EXTREME LOAD VARIATIONS

[75] Inventor: Robert J. Boschert, San Jose, Calif.
[73] Assignee: Boschert Assoc., Sunnyvale, Calif.
[21] Appl. No.: 743,859
[22] Filed: Nov. 22, 1976
[51] Int. Cl.² .................... H02M 3/28; H03K 3/16
[52] U.S. Cl. .................. 331/113 A; 363/25; 363/56; 331/62
[58] Field of Search .......... 331/113 A, 62; 321/2, 321/11-13, 45 R, 49

[56] References Cited
U.S. PATENT DOCUMENTS 3,004,226 10/1961 Jensen .................. 331/113 A
3,323,075 5/1967 Lingle .................. 331/113 A Primary Examiner—Siegfried H. Grimm

[57] ABSTRACT

A magnetically coupled two transistor multivibrator for use with power supplies. In addition to the usual collector driven output transformer, an auxiliary transformer having its secondary winding in series with the transistor base drive circuits is employed. The auxiliary transformer has primary windings powered by emitter current. Provision is also made for feedback from the main output transformer so that the secondary base drive windings can be powered from either emitter or collector currents. Electronic means are employed to isolate the output transformer from the base drive transformer upon the occurrence of a short circuit in the load, thus permitting the emitter windings to take over the function of supplying feedback and maintaining oscillations.

5 Claims, 4 Drawing Figures

INVERTER CONVERTER CIRCUIT FOR MAINTAINING OSCILLATIONS THROUGHOUT EXTREME LOAD VARIATIONS

BACKGROUND OF THE INVNTION

1. Field of the Invention

This invention pertains to transistor saturable reactor circuits sometimes referred to as multivibrators and in more recent electronic terminology as inverters or D.C. to D.C. converters. Hereinafter, they will be termed multivibrators. More specifically this invention pertains to a circuit method of preventing transistor failure due to a loss of transistor switching action when a load short circuit occurs. Switching action is continued by feedback energy supplied from a separate base drive transformer by way of windings in the emitter circuits of the two transistors.

2. Description of the Prior Art

It is common knowledge that when the load of these devices, prior to my invention, suffers a short circuit, switching action ceases because the feedback signal is no longer available at the output transformer. Invariably one transistor hangs up and stays on while the other remains off. The "on" transistor burns up because it is then subjected to a one hundred percent duty cycle with almost twice the power dissipation that it would have if it were switching. Attempts have been made to devise circuits that will prevent this catastrophe but none of them have proven satisfactory to date.

Multivibrators with feedback taken from collector windings as well as those with feedback from emitter windings have long been known. This circuit provides a means of combining a collector feedback multivibrator with one having feedback supplied by emitter current. By the use of an ingenious electronic barrier between the two commonly known sources of feedback the circuit can be made to oscillate in either of the two modes depending upon whether the collector feedback voltage is strong enough to overcome the barrier. The circuit is simple and rugged, requiring a minimum of parts and giving very reliable operation.

SUMMARY

The heart of this invention is the use of two separate transformers, one providing collector feedback at a high voltage and another providing emitter feedback at a lower voltage with an electronic threshhold barrier which requires a finite A.C. voltage to overcome same placed between the two transformers. This multivibrator is of conventional design. However, in addtion to the normal collector feedback taken from the output transformer there is installed a base drive transformer. The base drive transformer has secondary windings which drive the base circuits of the two switching transistors. The base drive transformer also has primary windings powered by the current flowing through the two switching transistor emitters. The secondary wndings of the base drive transformer may be driven either by normal collector feedback from the output transformer or by the aforesaid emitter driven primary windings on the base drive transformer. The circuitry is so arranged that the two different methods of feedback are phased so as to add to one another. Normally the feedback windings on the output transformer produce a substantial voltage which is sufficient to overcome the A.C. voltage barrier in the circuit between the output transformer and the base drive tranformer. Hence this mode of feedback is the normal one and exists at all times until there is a short circuit on the load causing the feedback from the output transformer to fail. The voltage produced by the emitter driven primary windings on the base drive transformer is just sufficient to drive the base circuits by way of the aforesaid secondary windings. It is not high enough to jump or override the barrier to the output transformer and it is this feature that prevents the "dead" shorted output transformer from taking power from the emitter driven primary windings on the base drive transformer. Oscillations are therefore maintained in spite of the fact that the load is short circuited.

DESCRIPTION OF THE PREFERRED EMBODIMENTS

Figure 1:
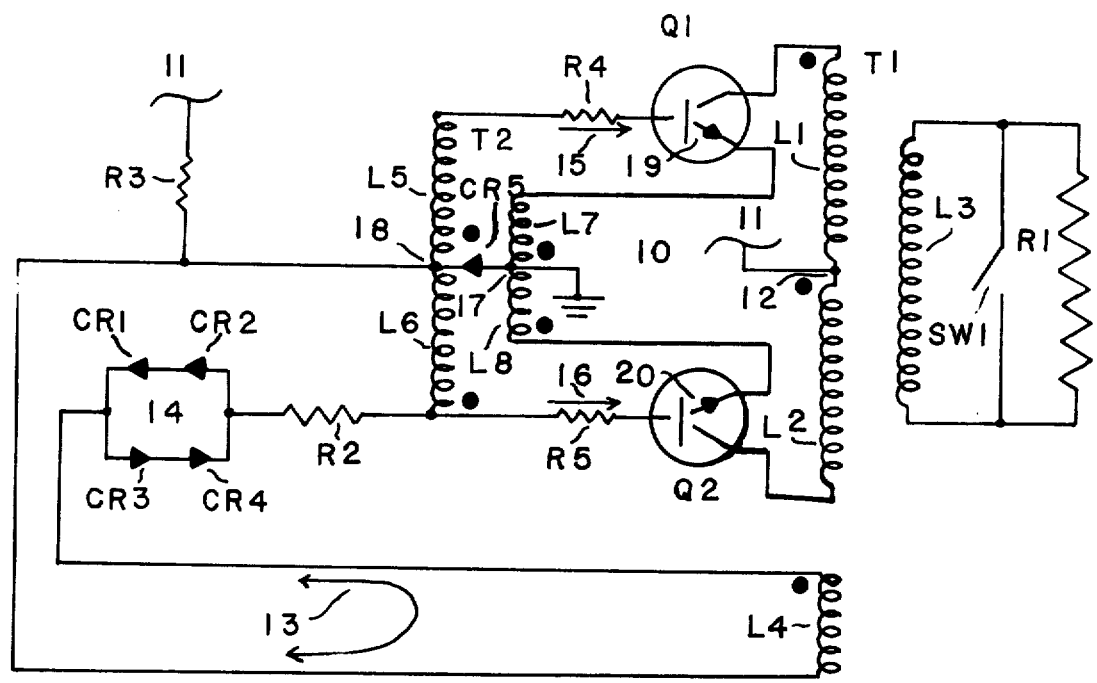
FIG. 1 shows a preferred embodiment of this invention in its most simple and preferred form.

In FIG. 1 is shown a simple and rugged embodiment of this invention having a minimum of parts. The circuit is a D.C./A.C. inverter but of course the inventions can be used just as well for a converter. The multivibrator 10 has the customary output transformer T1 with two collector windngs L1 L2; a load winding L3, with load R1 and a feedback winding L4. D.C. supply voltage 11 is connected to the center tap 12 of the two collector windings L1 L2. In addition it has a second transformer which we shall henceforth term a base drive transformer T2. In normal operation the output transformer T1 feedback winding L4 which is directly connected to one of the secondary winding L5 or L6 on the base drive transformer T2 supplies the necessary feedback. In this mode of oscillation alternating current circulates around the feedback path indicated by the double pointed arrow 13. In series with this path is an A.C. voltage threshhold barrier 14 consisting of a four diode CR1–CR4 array plus a resistor R2. The resistor R2 is optional and may be omitted by increasing or decreasing the number of diodes to give optimum performance. Base drive alternating unidirectional current circulates in the base circuit paths indicated by the single pointed arrows 15 16. In this normal mode the two emitter windings L7 L8 of the base drive transformer T2 produce a feedback current in the secondary windings L5 L6 which is added to that produced by the feedback winding L4 on the output transformer T1. The normal feedback voltage from the feedback winding L4 on the output transformer T1 is able to overcome the barrier 14. However, an A.C. voltage greater than that generated by the emitter windings L7 L8 of the base drive transformer T2 is required to overcome the barrier 14. Because of this, in the emitter driven mode, all currents generated by the base drive transformer T2 are confined to the base drive circuits of the two switching transistors Q1 Q2. Upon the occurrence of a short circuit indicated by the closing of the switch SW1 across the load winding L3 the magnetic flux of the output transformer T1 decreases and can no longer produce sufficient voltage in the feedback winding L4 to overcome the barrier 14 which now isolates it from the base drive transformer T2. The two emitter windings L7 L8 on the base drive transformer T2 now take over as the primary driving source for circulating current 15 16 around the base circuits of the two switching transistors Q1 Q2. The voltage developed by these windings L7 L8 is insufficient to overcome the barrier 14 and hence no energy is taken from the base drive transformer T2 by the "dead" output transformer T1. All current induced in the secondary windings L5 L6 of the base drive transformer T2 is forced to flow through the base circuits of the two switching transistors Q1 Q2. In this manner oscillations powered solely by the base drive transformer T2 emitter windings L7 L8 are caused to continue. The starting resistor R3 connected to the power supply 11 is well known and supplies power to initiate start up of oscillations in either mode. The two resistors R4 R5 in the base circuits of the two switching transistors Q1 Q2 are the customary current limiting resistors employed in multivibrators. They may be omitted if the feedback voltages are carefully adjusted so as not to produce too much current. The diode CR5 between the center tap 17 of the base drive transformer emitter windings L7 L8 and the center tap 18 of the secondary windings L5 L6 is a steering diode and has the function of forcing current to take the paths indicated by the single pointed arrows 15 16 through the base/emitter junctions 19 20 of the two switching transistors Q1 Q2. The frequencies of the two modes of oscillation may be slightly different but the important point is that switching continues in spite of the short circuited load indicated by the closing of switch SW1. If the short circuit should be removed, indicated by the opening of the switch SW1 the output transformer T1 would again function normally, the voltage developed by the feedback winding L4 on the output transformer T1 would increase and override the barrier 14 and the multivibrator 10 would shift back to the collector driven mode. The transition between modes is smooth and certain.

Figure 2:
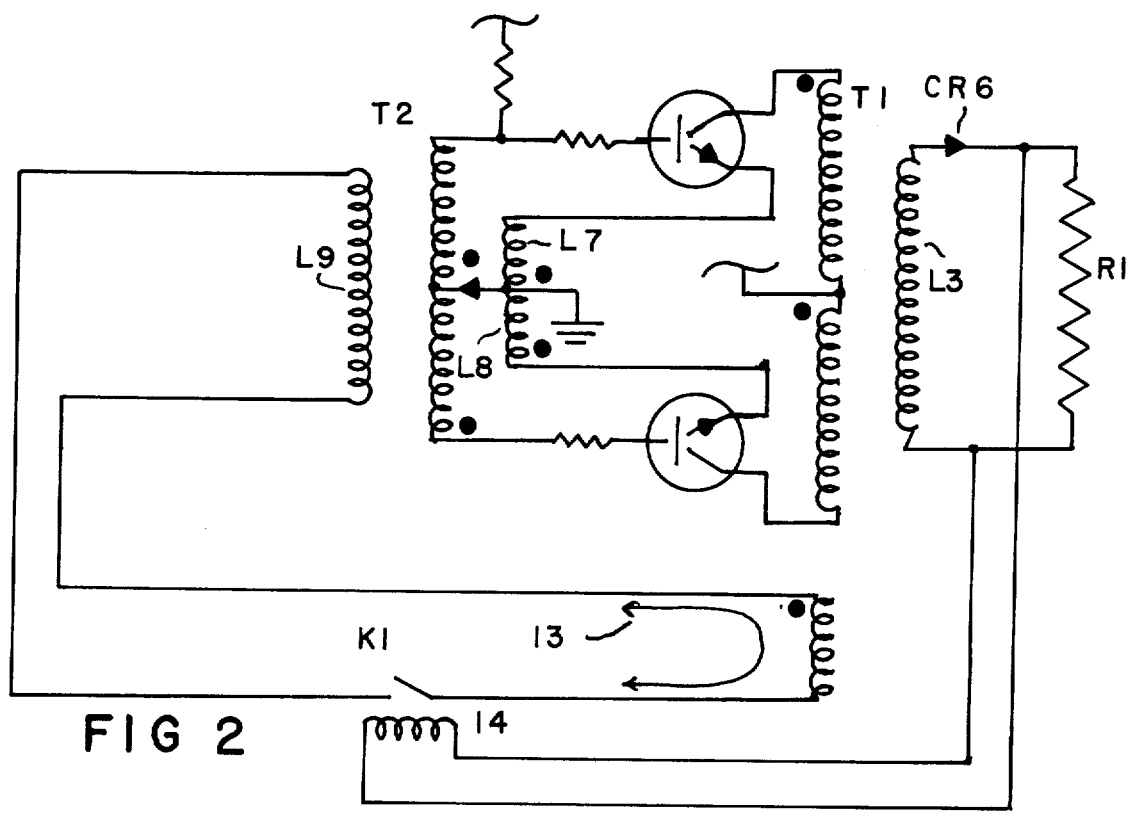
FIG. 2 shows an embodiment wherein collector feedback to the base drive transformer is transformer coupled rather than direct. Also a relay is installed here as the barrier.

In FIG. 2 is shown another configuration of this invention. In this circuit the feedback 13 from the output transformer T1 to the base drive transformer T2 is magnetically coupled by an independent winding L9 on the base drive transformer T2. Also the barrier 14 of FIG. 1 has been replaced by a normally open relay K1. When the circuit is first started up the emitter driven windings L7 L8 of the base drive transformer T2 start up oscillation. Shortly thereafter the voltage, rectified by diode CR6, across the load R1 increases sufficiently to cause the relay K1 to close and the circuit operates normally thereafter. When a short circuit occurs in the load R1 the voltage of the load winding L3 decreases and the normally open relay K1 now opens thus isolating the base drive transformer T2 from the "dead" output transformer T1. In this way the relay K1 is caused to act as a threshhold barrier 14.

Figure 3:
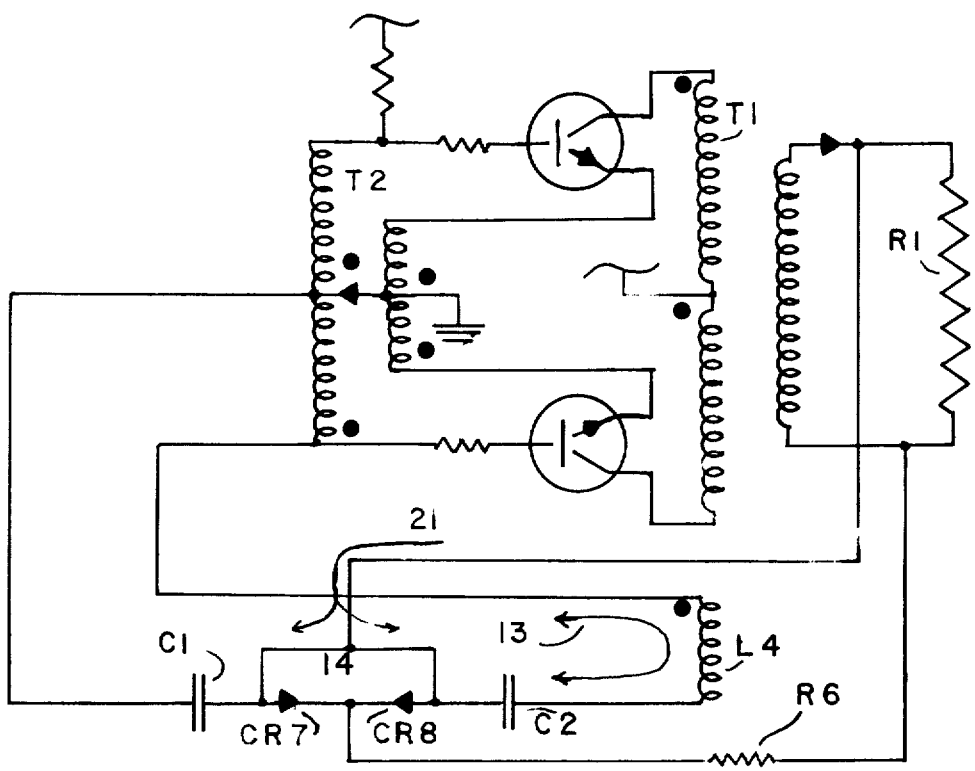
FIG. 3 shows an embodiment of this invention using two capacitors and two diodes as a threshhold barrier.

In FIG. 3 is shown another configuration where the feedback 13 from the output transformer T1 feedback winding L4 is again directly connected. The barrier 14 in this configuration consists of two diodes CR7 CR8 facing in opposite directions and D.C. isolated by blocking capacitors C1 C2. The normal output voltage across the load R1 forward biases these diodes CR7 CR8. The D.C. current flowing through the diodes CR7 CR8 indicated by arrows 21 is limited by the current limiting resistor R6. Alternating feedback current 13 rides on the direct current 21 flowing through the diodes CR7 CR8. Upon failure of the output voltage the diodes CR7 CR8 block alternating current 13 feedback and thus isolate the base drive transformer T2 from the feedback winding L4 on the output transformer T1.

Figure 4:
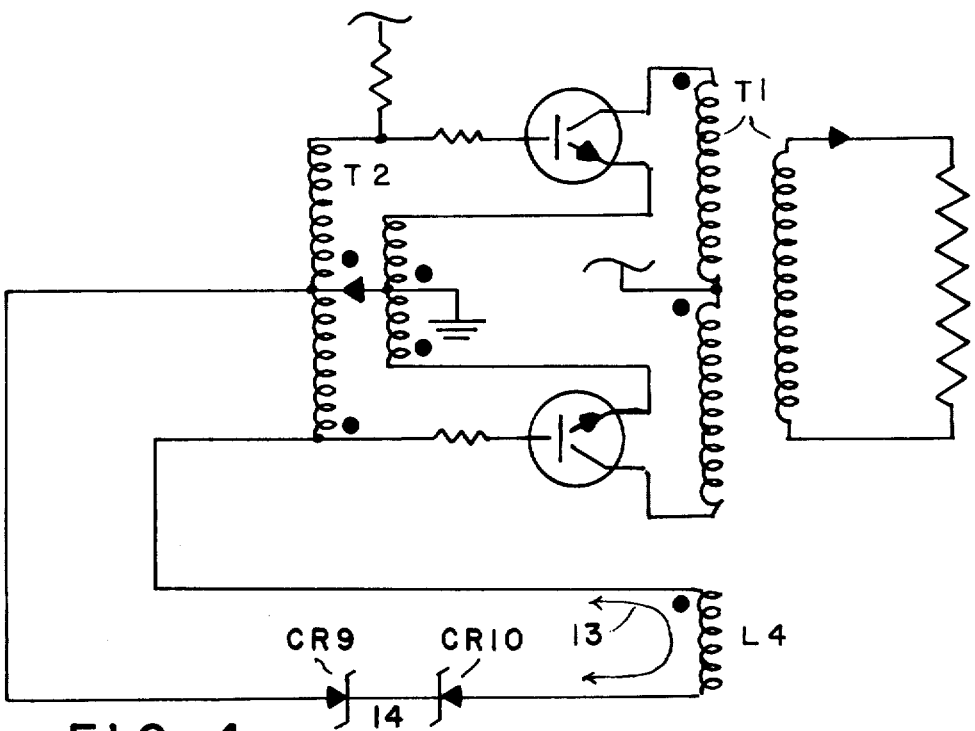
FIG. 4 shows still another embodiment of this invention showing the use of two back to back zener diodes as a threshhold barrier.

In FIG. 4 is shown still another configuration wherein the barrier 14 is made up of two back to back zener diodes CR9 CR10. Here the feedback from the output transformer T1 is isolted from the base drive transformer T2, unless the output transformer T1 feedback winding L4 develops sufficient voltage to overcome the two zener diodes CR9 CR10 in both directions.

One skilled in the art can easily duplicate any of the disclosed embodiments using standard parts. However some small difficulty might be encountered in the case of the base drive transformer of FIG. 1. The following has been found to provide a satisfactory base drive transformer for T2.

Core made by T.D.K. Company H5C 2T5-10-2.5. Secondary winding (L5 and L6) made up of 11 turns each of #26 wire.

Primary windings (L7 and L8) made up of one turn each of #20 wire.

It should be understood of course that the foregoing disclosure relates to only a preferred embodiment and that numerous modifications and alterations may be made without departing from the spirit and scope of the invention as hereinafter defined by the appended claims as only a preferred embodiment thereof has been disclosed.

What is claimed is.

1. A two transistor magnetically coupled multivibrator for use with power supplies capable of maintaining oscillations under extreme load conditions comprising:
   a conventional multivibrator with a collector driven output transformer having load windings and transistor base drive feedback windings,
   a base drive transformer in addition to the said output transformer having primary windings powered by emitter currents of the two transistors, and having secondary windings connected to drive the base/emitter circuits of the two transistors and powered by feedback from both the output transformer feedback windings and the said base drive transformer primary windings,
   and an electronic means of disconnecting the said output transformer feedback windings from the said base drive transformer upon the occurrence of a load short circuit so that the electrically "dead" output transformer is thereafter prevented from drawing power from the said base drive transformer and oscillations will continue solely due to feedback within the said base drive transformer.

2. A two transistor magnetically coupled multivibrator according to claim 1 wherein:
   the electronic means of disconnecting consists of a threshhold bidirectional voltage barrier which can be overridden by the output transformer feedback but not by the relatively lower voltage feedback within the base drive transformer, said barrier consisting of a diode array providing diode forward voltage drops in either direction.

3. A two transistor magnetically coupled multivibrator according to claim 1 wherein:
   the electronic means of disconnecting consists of a normally open relay, the relay coil being energized by the load output voltage so that the relay opens when the output voltage fails.

4. A two transistor magnetically coupled multivibrator according to claim 1 wherein:

the electronic means of disconnecting consists of two opposite facing diodes which are D.C. isolated by two capacitors, said diodes being forward biased from the D.C. load output voltage through a current limiting resistor so that the A.C. feedback from the output transformer can ride on the D.C. current through the diodes as long as there is a D.C. output voltage which forward biases the said diodes but not when the D.C. output voltage fails due to a load short circuit.

5. A two transistor magnetically coupled multivibrator according to claim 1 wherein:

the electronic means of disconnecting consists of a voltage barrier made up of two back to back zener diodes so that the output transformer normal feedback voltage can override said barrier but the relatively lower voltage feedback from the base drive transformer cannot, thus preventing the output transformer from drawing power from the base drive transformer when a load short circuit occurs.

* * * * *